United States Patent Office 2,785,079
Patented Mar. 12, 1957

2,785,079

DYE TONED PRINTING INKS

Andries Voet, Borger, Tex., assignor to J. M. Huber Corporation, Borger, Tex., a corporation of New Jersey No Drawing. Application January 28, 1953,
Serial No. 333,831

10 Claims. (Cl. 106—23)

This invention relates to printing inks and particularly to black printing inks containing carbon black and coloring matter.

Black printing inks are prepared by dispersing carbon black in a vehicle such as mineral oil or a drying oil which in addition may contain resinous binders and dispersing aids. Inks prepared in this manner exhibit the brownish color of channel carbon black or the grey of furnace carbon blacks and a desirable degree of blackness or "toning" is produced by the incorporation of blue, green, or violet dyestuff as a toner or supplemental coloring material.

Ordinarily this coloring matter is added to the ink in an oil soluble form. This may be accomplished by heating a basic dyestuff such as methyl violet base in oleic acid, thus forming an oil-soluble oleate of the dyestuff, before adding it to the ink. Such toners remain effective for considerable time in the presence of soluble zinc salts but slowly decrease in strength until the toner is no longer effective. The amount of toner which can be employed is limited because the dyestuff migrates with the oil and an excessive amount of dyestuff will color the entire printed sheet and strike through to color the reverse side of the sheet. This limits the extent of toning which it is possible to obtain by this method.

In other cases large amounts of insoluble blue pigments are added along with the carbon black. In many cases the weight of blue pigment may be half or more of that of the carbon. This method of toning is limited because of the very great increase in the cost of the ink.

An object of the present invention is to produce a permanent toned effect by means of dyestuffs. A further object is to provide a printing ink colored with dyestuff in such a manner that the dyestuff does not migrate with the ink vehicle but does give a valuable toning effect. An additional object is to provide a much greater toned effect than has previously been possible by the use of soluble colors.

These objects may be accomplished by the addition to the printing ink of a solution of a dyestuff which is insoluble in the ink vehicle in a solvent which is soluble in the ink vehicle.

When dyestuffs insoluble in the ink vehicle are used, it is possible to use considerable quantities of dye because it is no longer possible for the dye to migrate into the paper with the ink vehicle. When a solution of such a dyestuff in a solvent which is soluble in the ink vehicle is added to the ink, and the ink is applied to the paper, the vehicle is absorbed by the paper and the dyestuff is precipitated in a colloidal form. This dyestuff appears to collect on the surface of the carbon black and becomes a part of the solid portion of the ink. Inks toned in this manner retain their toned effect permanently.

The inks of this invention preferably are prepared by adding the solution of the dyestuff either toward the end of the grinding period or by stirring the solution into the ink after the grinding period is complete.

The invention is illustrated by the following examples:

Example 1

A news ink was prepared by incorporating 12 parts of carbon black and one part of gilsonite into 88 parts of mineral oil. One portion of 100 grams of this ink was treated with 0.2 gram of methyl violet dissolved in 2 cubic centimeters of isopropanol, by stirring the solution into the ink with a mechanical stirrer. When this toned ink was drawn down on a sheet of paper near to a portion of the untoned ink similarly drawn down on the same sheet, the toned ink had a black appearance while the untoned ink had a brownish color. This toning effect remained unaltered in the ink after two months of storage.

Example 2

A news ink was prepared by incorporating 9 parts of channel carbon black and 3 parts of furnace carbon black in 87 parts of mineral oil containing one part of asphalt pitch. One portion of 100 grams of this ink was treated by stirring into it a solution of 0.1 gram of victoria blue in 1.9 grams of butanol. This produced a very strongly toned ink which retained its toned effect undiminished after three months of storage.

Example 3

A heat set ink was prepared from a varnish consisting of equal parts of a mineral hydrocarbon solvent for the most part vaporizing below 200° C., such as mineral spirits, and zincated rosin. The ink was pigmented with 14 parts of channel carbon in 86 parts of the varnish. A solution of 0.2 gram of crystal violet in 1.8 grams of butyl carbitol (butyl ether of diethylene glycol) was stirred in roughly, and the ink was given one loose pass on a three roller ink mill. This produced an intensely toned ink from which the toner does not bleed into the paper. The toned effect was undiminished after six weeks.

Solvents for the dye which have been used satisfactorily in this invention include isopropanol, n-butanol, n-pentanol, methyl ethyl ketone, methyl propyl ketone, methyl amyl ketone, methyl isobutyl ketone, di-isobutyl ketone, butyl cellosolve (butyl ether of ethylene glycol), and butyl carbitol (butyl ether of diethylene glycol). These solvents are satisfactory in such vehicles as mineral oil, linseed oil, solutions of resins in mineral spirits. In addition, such solvents as pentanedione and cellosolve (ethyl ether of ethylene glycol) are satisfactory in linseed oil and in many solutions of resins in mineral spirits. Many other useful solvents will be apparent, the requirement being that the solvent shall dissolve the dyestuff and at the same time be soluble in the ink vehicle, the dyestuff itself being insoluble in the ink vehicle.

The dyestuffs ordinarily employed to produce black or blue shades are generally some shade of blue, violet or green. Among the dyes which are satisfactory are methyl violet, methylene blue, malachite green, crystal violet 6B and victoria blue B. Other dyestuffs effective to produce the desired toned effects will be apparent to those skilled in the art.

It is to be understood that the details set forth hereinbefore are exemplary and that the principles of the disclosed invention may be practiced by the used of various other substances and compositions within the scope of the appended claims.

What is claimed is:

1. A printing ink consisting essentially of a dispersion of coloring matter consisting predominantly of carbon black in a printing ink vehicle consisting essentially of water-immiscible liquid, said dispersion having had incorporated therein a small amount of a solution of an oil-insoluble toning dyestuff in an oil-soluble liquid solvent which is soluble in said liquid.

2. A printing ink of the news ink type consisting essentially of a dispersion of coloring matter consisting predominantly of carbon black in a water-immiscible liquid consisting essentially of mineral oil, said dispersion having had incorporated therein a small amount of a solution of a toning dyestuff insoluble in said mineral oil in a liquid solvent which is soluble in said mineral oil.

3. A printing ink consisting essentially of a dispersion of coloring matter consisting predominantly of carbon black in a printing ink vehicle consisting essentially of water-immiscible liquid, said dispersion having had incorporated therein a small amount of a solution of an oil-insoluble toning dyestuff in a liquid alcohol which is soluble in said liquid.

4. A printing ink consisting essentially of a dispersion of coloring matter consisting predominantly of carbon black in a printing ink vehicle consisting essentially of water-immiscible liquid, said dispersion having had incorporated therein a small amount of a solution of an oil-insoluble toning dyestuff in a liquid ketone which is soluble in said liquid.

5. A printing ink consisting essentially of a dispersion of coloring matter consisting predominantly of carbon black in a printing ink vehicle consisting essentially of water-immiscible liquid, said dispersion having had incorporated therein a small amount of a solution of an oil-insoluble toning dyestuff in a liquid aliphatic alcohol-ether which is soluble in said liquid.

6. A printing ink of the heat-set type consisting essentially of a dispersion of coloring matter consisting predominantly of carbon black in a solution of a resinous binder in a mineral hydrocarbon, said dispersion having had incorporated therein a small amount of a solution of a toning dyestuff insoluble in said hydrocarbon in a liquid solvent which is soluble in said hydrocarbon.

7. A printing ink of the drying oil type, consisting essentially of a dispersion of coloring matter consisting predominantly of carbon black in a water-immiscible liquid consisting predominantly of a drying oil, said dispersion having had incorporated therein a small amount of a solution of a toning dyestuff insoluble in said drying oil in a liquid solvent which is soluble in said drying oil.

8. The method of toning a black printing ink consisting essentially of a dispersion of carbon black in a water-immiscible liquid which comprises dispersing throughout said dispersion an amount sufficient to tone the ink but not exceeding several per cent by weight of a solution of a toning dyestuff that is insoluble in said liquid in a liquid solvent that is soluble in said liquid.

9. A dye-toned black printing ink consisting essentially of a dispersion of carbon black in a printing ink vehicle consisting essentially of water-immiscible liquid and having had dispersed throughout said dispersion an amount sufficient to tone the ink but not exceeding several per cent by weight of a solution of a toning dyestuff that is insoluble in said liquid in a liquid solvent that is soluble in said liquid.

10. A dye-toned black printing ink consisting essentially of a dispersion of carbon black in a printing ink vehicle consisting essentially of water-immiscible liquid and having had dispersed throughout said dispersion an amount sufficient to tone the ink but not exceeding several per cent by weight of a solution of a toning dyestuff that is insoluble in said liquid in a liquid aliphatic alcohol that is soluble in said liquid.

References Cited in the file of this patent

UNITED STATES PATENTS

| | | |
|---|---|---|
| 113,755 | Farrar | Apr. 18, 1871 |
| 243,441 | Froehling | June 28, 1881 |
| 412,184 | Holt | Oct. 1, 1889 |
| 824,475 | Friedman | June 26, 1906 |
| 1,833,086 | Middleton | Nov. 24, 1931 |
| 2,004,514 | Battle | June 11, 1935 |
| 2,135,735 | Schwabe | Nov. 8, 1938 |
| 2,139,242 | Mock | Dec. 6, 1938 |
| 2,236,602 | Neidlich | Apr. 1, 1941 |
| 2,439,380 | Carman | Apr. 13, 1948 |
| 2,519,321 | Newman | Aug. 15, 1950 |

FOREIGN PATENTS

| | | |
|---|---|---|
| 616,476 | Great Britain | Jan. 21, 1949 |
| 267,625 | Great Britain | Mar. 22, 1927 |